United States Patent [19]

Hartman

[11] Patent Number: 5,634,626
[45] Date of Patent: Jun. 3, 1997

[54] VALVE ASSEMBLY PLUG AND BODY SEAT IMPROVEMENTS

[76] Inventor: Thomas A. Hartman, 700 Capac Ct., St. Louis, Mo. 63125

[21] Appl. No.: 287,663

[22] Filed: Aug. 9, 1994

[51] Int. Cl.⁶ .................................................. F16K 5/06
[52] U.S. Cl. ........................ 251/315.07; 251/315.13; 251/314
[58] Field of Search ................ 251/315.07, 315.13, 251/316, 363, 306, 314

[56] References Cited

U.S. PATENT DOCUMENTS

| | | | |
|---|---|---|---|
| 2,663,538 | 12/1953 | Bacchi | 251/315.07 X |
| 2,983,281 | 5/1961 | Bynum | 251/363 X |
| 3,076,631 | 2/1963 | Grove | . |
| 3,794,291 | 2/1974 | Suyama | 251/174 X |
| 3,895,776 | 7/1975 | Laurens | 251/174 X |
| 4,293,116 | 10/1981 | Hinrichs | 251/306 X |
| 4,515,347 | 5/1985 | Sitton et al. | 251/363 X |
| 4,579,477 | 4/1986 | Hartman | . |

OTHER PUBLICATIONS

Valve and Primer Corporation, APCO Willamette, Bulletin 2200/2600, 1992.
J. Paul Tullis, Ph.D.and Utah State University Foundation, Flow and Torque Tests, Hydraulic Report No. 278, May, 1991.
Willamette Iron and Steel Company, Willamette List 26 Ball Valve Catalog, 1961.

Primary Examiner—John C. Fox
Attorney, Agent, or Firm—Howell & Haferkamp, L.C.

[57] ABSTRACT

A valve with improved body and plug seats and methods of manufacturing the seats are disclosed. The body seat is separate from the valve body and is adhesively attached to the valve body about at least one of the valve body orifices. The body seat is adhesively attached to the valve body at an angle to compensate for plug-to-body eccentricity. The plug seat is replaceable and is formed of two rigid metallic rings connected by an elastomeric cylinder. The elastomeric cylinder is formed under pressure to reduce potential failure initiation sites.

13 Claims, 6 Drawing Sheets

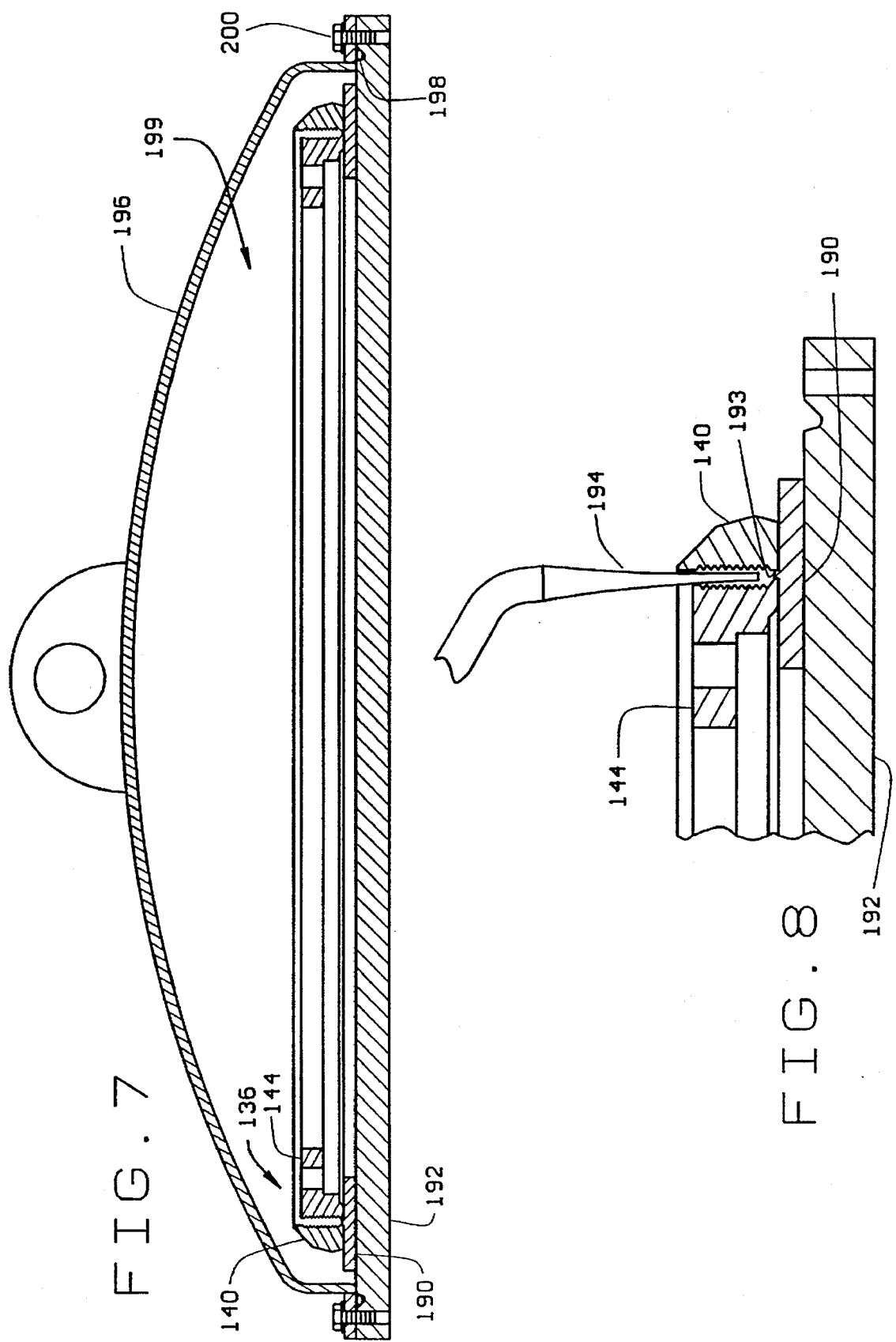

VALVE ASSEMBLY PLUG AND BODY SEAT IMPROVEMENTS

BACKGROUND OF THE INVENTION

(1) Field of the Invention

This invention is directed to the field of spherical plug valves. The invention is particularly directed to improvements to the structure and method of manufacturing the plug and body seats of spherical plug valves.

(2) Description of the Related Art

Spherical plug valves are well known in the prior art. This type of valve is used in fluid piping to start and stop the flow of fluid through piping by opening and closing the valve. The diameter of piping used with this valve ranges from a fraction of an inch to several feet in diameter; however, the subject invention is primarily directed to a spherical plug valve for fluid applications and for piping of a foot or more in diameter.

Typically, a spherical plug valve is comprised of a plug which rotates within a valve body to open and close the valve. The valve body generally has two orifices, although there may be more if the specific application requires. One of the orifices is the inlet port and the other is the exit port. Usually, these ports have a common axis or axes oriented 90° apart depending upon the specific application. The inlet port typically has an annular body seat, the function of which will be described later. The exit port may also have a body seat.

Generally, the valve plug includes a valve stem and a stub shaft, each having bushings, bearings and seals. The valve stem and coaxial stub shaft extend from opposite sides of the valve plug and through the bushings, bearings, and seals which mount the plug to the valve body. The bushings, bearings, and seals permit the plug to freely rotate within the valve body and seal the valve stem and stub shaft from leakage. As is well-known in the art, the valve stem is connected to a drive mechanism to rotate the stem through an arc and thereby rotate the plug within the body between the open and closed positions. At least one of the bearings is generally a thrust bearing to compensate for any axial forces which may be imparted to the valve plug by valve orientation, hydrostatic forces or an actuator force component of the drive mechanism.

The spherical valve plug is a species of plug valve which does not necessarily have a spherical plug. In fact, in the larger embodiments, the plug is preferably not spherical because a spherically-shaped plug would not be optimal in terms of conservation of material. Instead, the plug is more cylindrically shaped with the axis of the cylinder being perpendicular to the axis of plug rotation. The plug usually has a hollow bore extending along the cylinder axis, the bore having approximately the same interior diameter as the piping. The bore is configured to extend between the inlet port and the exit port of the valve body when the valve plug is in the open position. The plug also includes an annular plug seat which mates with the body seat to prevent or inhibit fluid flow through the valve when the plug is in the closed position. Thus, fluid flows through the plug bore between the inlet and exit ports of the valve body when the valve plug is in the open position and fluid is prevented from flowing through the valve body by the plug seat sealing against the body seat when the valve is in the closed position.

In order to effectively seal the plug seat and body seat, the valve plug is typically manufactured such that the center of rotation of the plug is not coincident with the center of the valve body. Instead, the center of rotation of the plug is slightly eccentric so that the relative motion between the plug seat and body seat is not entirely tangential as the plug enters the closed position. Thus, the plug and body seats will clamp shut and tightly seal against one another even with larger manufacturing tolerances and after the seats have worn.

Originally, the prior art seats were constructed of metals having significant hardness, but this required relatively tight tolerances on the seating surfaces or seal leakage would occur. In order to solve this problem, prior art seats for either the valve body or valve plug were formed incorporating a thin, resilient, and flexible rim around the seat. As the valve plug moved to the closed position the resilient rim would flex a little due to differential pressure acting on the back side, or high pressure side, of the rim. This would cause the seat rim to make contact with the other seat and close the valve. However, if a hard foreign object or piece of debris was trapped between the seal surfaces during valve closure, the flexible rim of the seat could become damaged or deformed due to its thin construction. Once deformed, the seat rim would not subsequently produce an effective seal. Thus, the resilient seat rim was typically made to be replaceable and was fastened in place by bolts, screw threads or shrink fit in place.

In order to solve the durability problem with resilient metallic seats, the inventor previously developed a resilient valve plug seat which consists of a rigid metallic seat ring connected to the valve plug by an elastomeric cylinder. The elastomeric cylinder permitted the seat ring to move relative to the plug and thereby compensated for manufacturing tolerances and wear. Thus, the improved plug seat with the elastomeric cylinder provided an adequate seal and was sufficiently rigid to prevent significant damage or deformation to the seat when a foreign object became trapped between the mating surfaces of the plug seat and body seat during valve closure. This elastomeric cylinder and plug seat has been the state-of-the-art from 1991 until the present. However, in order to refurbish this valve plug and return the plug seat surface to within originally manufactured tolerances, the valve must be taken out of service. The entire plug is then removed and replaced with a replacement plug having a plug seat with the original specifications. The worn plug can then be returned to the factory where the elastomeric cylinder and plug seat can be removed and a new plug seat and elastomeric cylinder can be installed.

The elastomeric cylinder is manufactured by inserting liquid silicone rubber between the plug seat and plug and permitting it to cure thereby forming the elastomeric cylinder from the silicone rubber. The periphery of the plug seat and the valve plug surface surrounding the seat and adjacent the elastomeric cylinder have circumferential serrations to achieve a mechanical bond of the elastomeric cylinder to the plug seat and plug surface. Air bubbles are often present in the silicone rubber after curing and can provide an initiation site for subsequent elastomeric cylinder failure. Thus, on occasion an elastomeric cylinder can develop leaks due to progressive collapse of the bubbles or voids in the elastomeric cylinder.

Due to the eccentricity between the center of rotation of the plug seat sealing surface and the valve body center, the body seat sealing surface is also eccentric relative to the valve body center. In prior art designs, the body seat was manufactured separately from the body and fastened in place. Due to the eccentricity of the body seat relative to the body, the body seat was machined eccentrically. This resulted in the body seat having different width dimensions about its circumference. This caused body seat manufacturing costs to be higher than they would be otherwise without the machined eccentricity. After the body seat and body were properly machined, they were typically fastened together using an epoxy polymer. As with the plug and plug seat, serrations were provided in the cylindrical body surface surrounding the body seat and in the cylindrical periphery of the body seat to improve the mechanical connection of the epoxy to the serrated surfaces. The surfaces of the valve body and the body seat which were connected together were typically cylindrical and an O-ring was positioned between the body surface and the periphery of the seat to prevent the epoxy from escaping from between the valve body and seat. Due to the cylindrical configuration of the valve body surface and the periphery of the body seat, the O-ring occasionally became pinched or torn during body seat insertion destroying its ability to seal between the valve body and body seat surfaces. In the event of O-ring pinching or tearing, the body seat had to be removed, a new O-ring had to be installed if necessary, and the body seat had to be reinstalled. This corrective process had to be performed prior to the epoxy curing or it would harden. In that event, the epoxy had to be removed prior to beginning the assembly process over. Thus, this process could become time consuming and expensive.

The present invention overcomes the disadvantages of the prior art spherical plug valves and provides a unique spherical plug valve apparatus and assembly method which improves performance, manufacturability, and maintainability.

SUMMARY OF THE INVENTION

In accordance with the valve assembly of the present invention, the valve body seat is made separate from the valve body and is mechanically connected to the valve body by an epoxy polymer. Unlike the prior art eccentric body seats, the body seat of the present invention is manufactured with a substantially constant axial width around its circumference and no eccentricity. The constant width body seat is positioned in the body at an angle prior to being mechanically bonded in place to match the plug-to-body eccentricity. Thus, the body seat may be machined to a constant width, thereby reducing manufacturing costs, and the required eccentricity is accomplished during assembly.

The valve body seat of the present invention also has a conical outer peripheral surface that opposes a generally cylindrical inner surface of the valve body. During initial insertion of the seat into the body, the seat peripheral surface and body inner surface are spaced a greater distance apart than prior art devices due to the tapered peripheral surface of the seat. Upon further insertion, the surfaces move closer to one another, also due to the tapered peripheral surface of the body seat. A pair of O-rings are positioned in two annular grooves in the valve body cylindrical inner surface and are gradually compressed as the body seat is inserted into its position within the cylindrical inner surface. Thus, the O-rings are less likely to roll out of the annular grooves or become pinched or torn during body seat insertion into the valve body, and the tapered or conical peripheral surface of the body seat of the present invention enables less time consuming, less expensive and easier assembly of the body seat into the valve body.

In addition to the improved valve body seat, the present invention also includes an improved plug seat to mate with the body seat. The plug seat is made in three parts, a rigid metallic seat ring and a rigid annular retainer that are mechanically bonded together by a resilient elastomeric cylinder. The seat ring and retainer are concentric and are connected to each other in a spaced relation by the elastomeric cylinder. The retainer is releasably fastened to the valve plug by threaded fasteners such that the plug seat is field replaceable should it become worn or damaged without requiring removal of the valve plug from the valve body. The elastomeric cylinder provides the seat ring with resilience and flexibility such that the body seat and plug seat will efficiently seal against each other even with increased manufacturing tolerances. In addition, the elastomeric cylinder permits the seat ring to flex should hard debris become lodged between the plug and body seats avoiding damage or deformation of these two seats. Thus, the plug seat of the present invention is less likely to become damaged or deformed by foreign objects than the resilient metallic prior art plug seats and is field replaceable unlike the prior art plug seats having elastomeric cylinders.

The scope of the invention also includes an improved curing method for the elastomeric cylinder connecting the plug seat ring to the annular retainer which reduces the size of air bubbles or voids which may form in the elastomeric cylinder. Reduction of the size of the voids reduces the size of potential failure initiation sites and thereby reduces the potential for failure of the elastomeric cylinder and extends its average life. The improved curing process involves positioning the annular retainer and seat ring concentrically on a forming plate. A dome is then placed over the plate. Next, silicone rubber is injected between the plug seat and retainer and is cured under elevated pressure to reduce the size of any bubbles or voids which may form in the silicone rubber.

By incorporating the several improved features and assembly procedures recited above, the valve assembly of the present invention overcomes the disadvantages commonly associated with prior art valve assemblies.

BRIEF DESCRIPTION OF THE DRAWINGS

Further objects and features of the present invention are revealed in the following Detailed Description of the Preferred Embodiment of the invention and in the drawing figures wherein:

FIG. 7 is a view of the valve plug seat and retainer in a curing fixture; and

FIG. 8 is a view of the valve plug seat and retainer showing injection of the elastomer.

DETAILED DESCRIPTION OF THE PREFERRED EMBODIMENT

Figure 1:
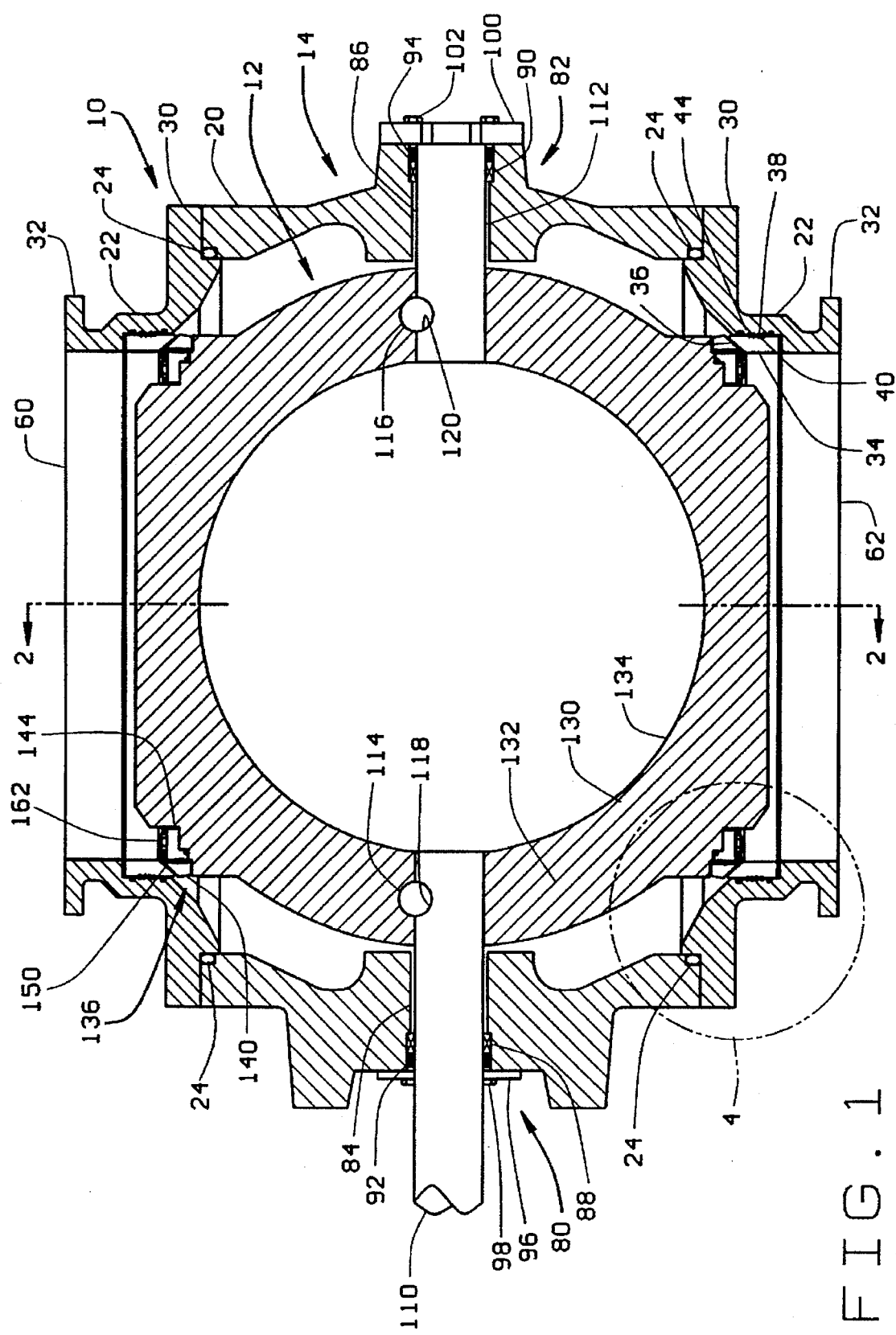
FIG. 1 is a cross-sectional view of the valve assembly of the invention having the improved plug and body seats of the present invention.

The valve assembly 10 of the present invention is generally comprised of a valve plug 12 rotatably mounted in a valve body 14. The valve body 14 is comprised of a cylindrical housing 20 having an annular flange adaptor 22 on each end. An O-ring 24 between the housing 20 and each flange adaptor 22 assures that the interfaces are sealed. Each flange adaptor has a housing flange 30 which mates with a complimentary surface on the housing 20 and a piping flange 32 which is used to connect the valve to piping (not shown).

Between the housing flange 30 and the piping flange 32 of each flange adaptor 22 is an annular body seat 34 that surrounds the opening of the flange adaptor. Each body seat has a frustoconical seating surface 36 (see FIGS. 4 and 5) and each body seat is mechanically bonded to a flange adaptor 22 by a polymeric epoxy 38. The epoxy 38 is introduced into an annular cavity 40 between an inner cylindrical surface 46 of the flange adaptor 22 and an outer peripheral surface 44 of the body seat 34 through sprues 42 that are spatially arranged around the flange adaptor. The outer surface 44 of the body seat 34 is generally conically shaped and tapers from top to bottom. This shape aids in its insertion into the flange adaptor 22 prior to injection of the epoxy. The flange adaptor has a generally cylindrical inner surface 46 which accepts the body seat. The inner surface 46 has two annular grooves 48, 50 configured to accept two O-rings 52, 54. The taper of the outer peripheral surface 44 of the body seat enables it to be inserted into the inner cylindrical surface 46 of the flange avoiding contact with the O-rings until the body seat is almost completely inserted at which point the O-rings are contacted by the body seat at substantially the same time. This prevents the O-ring 52 at the top of the body inner surface 46 from being rolled out of its annular groove by the body seat due to contact with the body seat as it is initially inserted. When the body seat 34 is inserted to its furthest extent in the cylindrical inner surface 46 of the valve body, the O-rings 52, 54 are compressed within their respective grooves 48, 50 between the body seat 34 and the inner surface 46. The compressed O-rings capture the epoxy 38 as it is introduced into the annular cavity 40 and prevent it from leaking out of the annular cavity 40. Serrations 56, 58 in the seat outer surface 44 and the body inner surface 46 aid in the mechanical bonding of the epoxy to the body seat 34 and flange adaptor 22 and assure a strong bond is formed.

The connection between the flange adaptor inner surface 46 and the peripheral surface 44 of the body seat formed by the epoxy is a mechanical connection and not an adhesive connection. To ensure this, the opposed surfaces of the flange adaptor and body seat are coated with a releasing agent prior to their assembly. This enables the body seat to be more easily removed from the valve body for later servicing or replacement of the seat.

The body seat 34 also has three equally-spaced radial lacking holes 70 (see FIG. 6) the use of which will be described later.

The opening through the center of each flange adaptor 22 forms a port, the upstream port being the inlet port 60 and the downstream port being the exit port 62. In the preferred embodiment, both the housing flange 30 and piping flange 32 have holes 64, 66 spaced about their circumferences to accept fasteners 68 therethrough for coupling the respective joints.

In between the flange adaptors the valve body 14 has two hubs 80, 82 with openings extending through the valve housing 20 near its center. Each hub opening has a bronze bushing 84, 86, a bearing 88, 90, and a seal ring 92, 94 associated therewith. At least one of the bearings 88, 90 is a thrust bearing to compensate for any axial forces exerted on the hubs. An annular cover plate 96 is bolted to the housing over the hub opening 80 by fasteners 98. A solid cover plate 100 is bolted to the housing 20 over the other hub opening 82 by fasteners 102.

A valve stem 110 is rotatably mounted within hub opening 80 and is used to rotate the valve plug 12 between its open and closed positions by a mechanical actuator (not shown). A stub shaft 112 is mounted within hub opening 82. Both the valve stem 110 and stub shaft 112 are fixed to the plug 12 by conical keys 114, 116 driven into keyways 118, 120 formed in the valve stem, stub shaft, and plug.

The valve plug 12 is comprised of a cylinder 130 having the valve stem 110 and stub shaft 112 mounted thereto halfway between its ends. A hollow bore 134 extends axially through the center of the cylinder 130 perpendicular to the stem 110 and stub shaft 112. The diameter of the bore 134 is approximately the same as the diameter of the inlet and exit ports 60, 62.

Figures 4, 5:
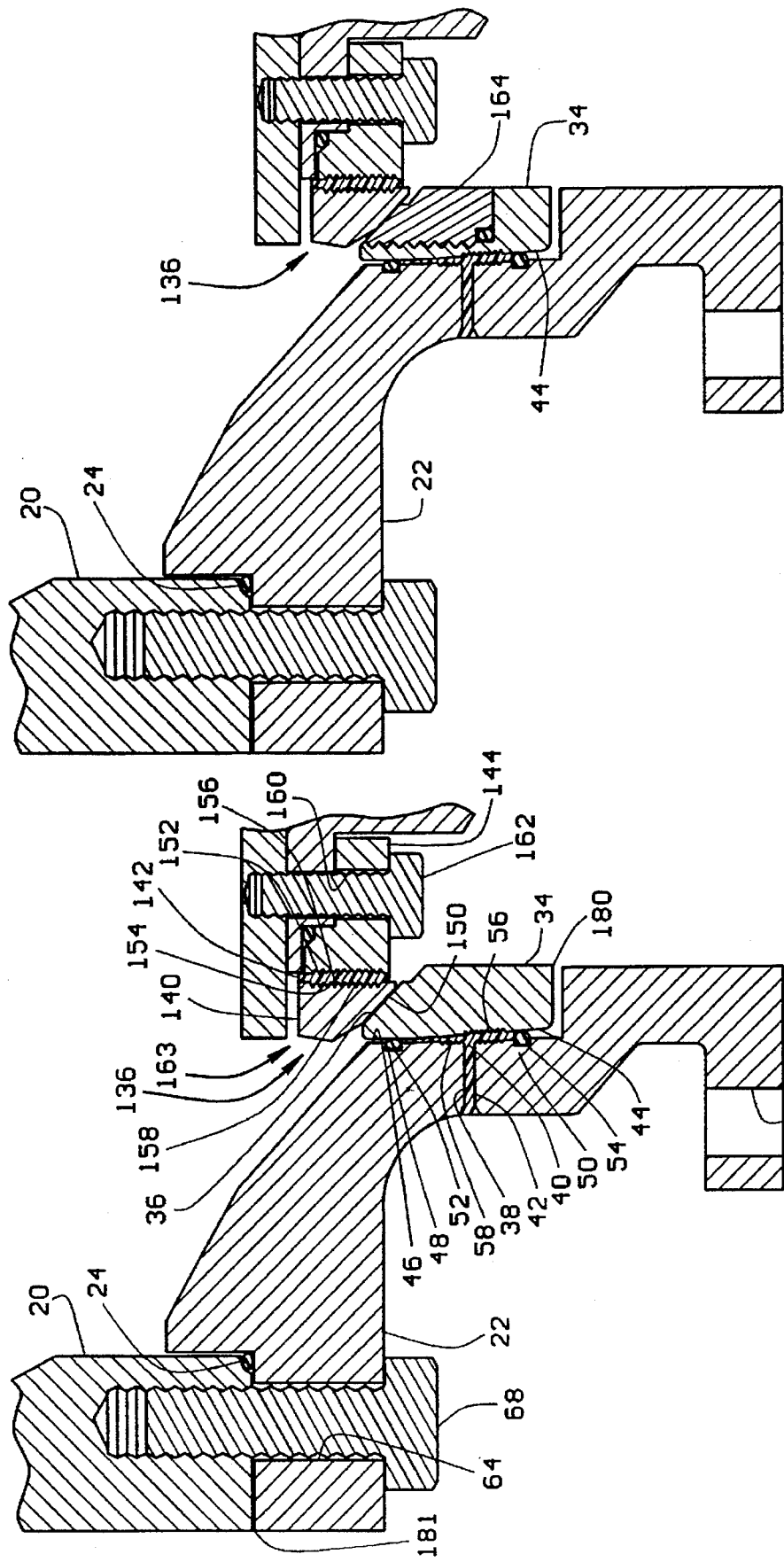
FIG. 4 is an enlarged view of the plug and body seats taken in the circumscribed area 4 of FIG. 1.
FIG. 5 is an enlarged view of the plug and body seats showing an alternate embodiment having a replaceable body seat insert.

Two annular plug seats 136 are mounted on opposite sides of the plug with their center axes substantially orthogonally located with respect to the center axes of the plug bore 134 and the valve stem 110. Referring to FIG. 4, each plug seat 136 is comprised of a seat ring 140, an elastomeric cylinder 142 and an annular retainer 144. Each seat ring 140 has a frustoconical sealing surface 150 which mates with the frustoconical sealing surface 36 of one of the body seats 34 to seal the valve when in the closed position. The inner generally cylindrical surface 152 of the seat ring 140 and the outer generally cylindrical surface 154 of its associated retainer 144 each have serrations 156 and 158 which improve the mechanical bond between the seat ring, retainer, and elastomeric cylinder 142 positioned between the ring and retainer. The retainer 144 has holes 160 about its circumference through which fasteners 162 extend to fasten the retainer of the plug annular seat 136 to the plug 12. The seat rings 140 and valve plug 12 are configured to provide a gap 163 between their adjacent surfaces to permit the seat rings to move relative to the valve plug when the seat rings engage with the body seats on closing the valve. This ensures that the plug and body sealing surfaces properly engage to close the valve.

Figure 2:
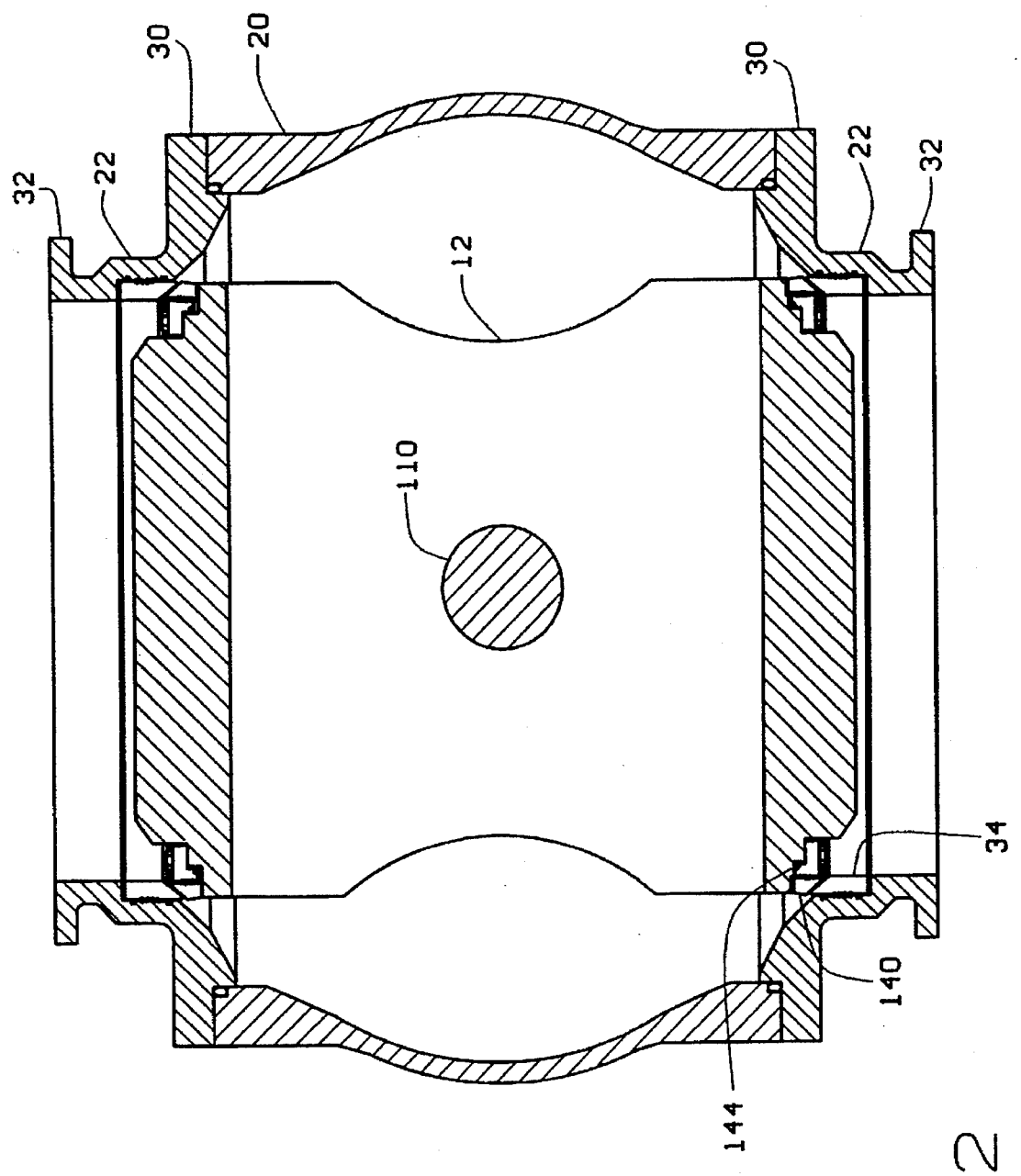
FIG. 2 is a cross-sectional view of the valve taken in the plane of line 2—2 of FIG. 1 showing the valve in the closed position.
Figure 3:
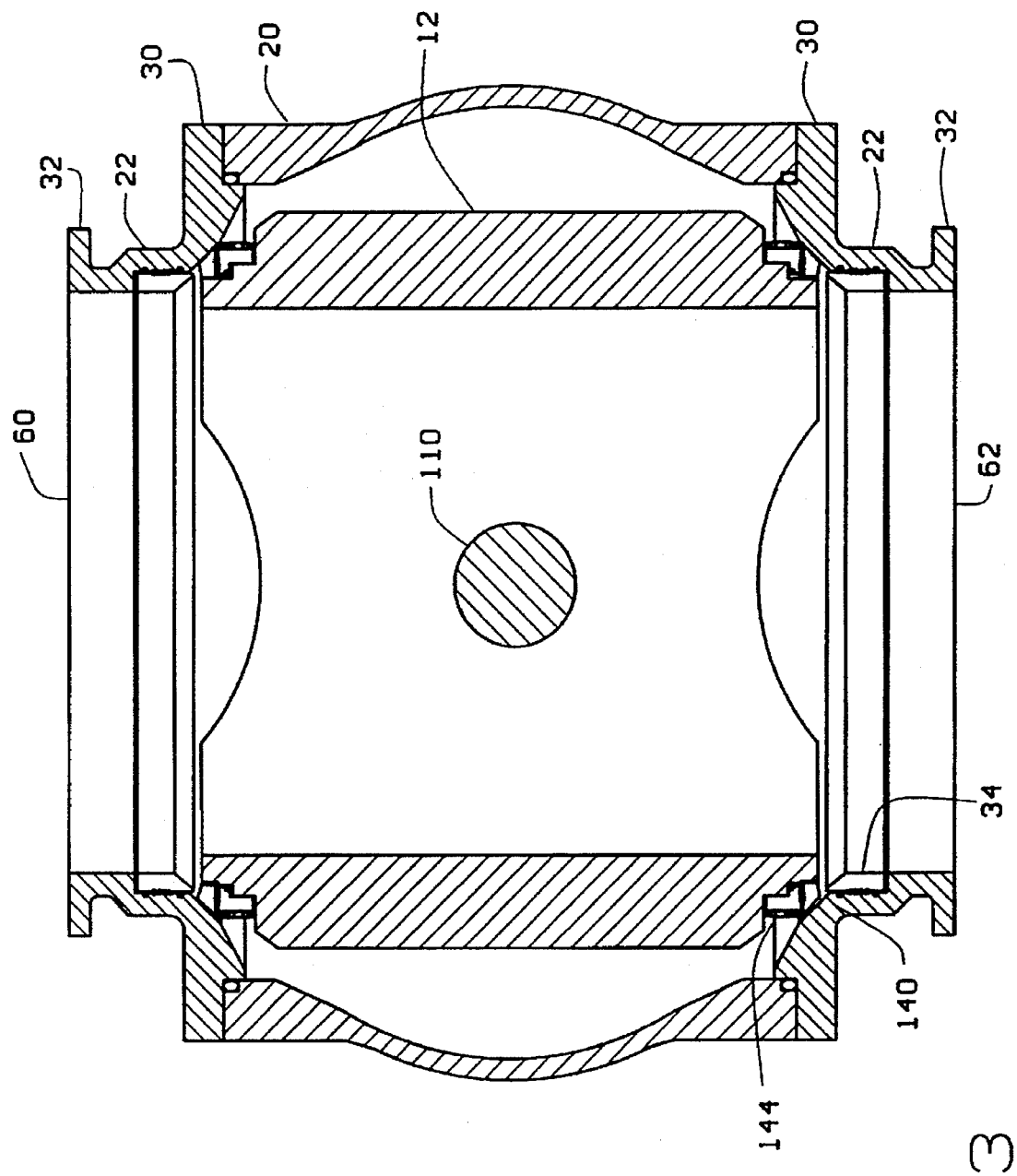
FIG. 3 is a cross-sectional view of the valve showing the valve in the open position.

In operation, the valve assembly 10 is fastened to lengths of pipe (not shown) at the piping flanges 32 of the flange adaptor 22. The pipe at one end of the plug valve is the inlet pipe and the pipe at the other end is the exit pipe. Fluid flows from the inlet pipe to the exit pipe through the valve when the valve is in the open position shown in FIG. 3. When the valve is in the closed position shown in FIG. 2, the fluid is prevented from flowing from the inlet pipe to the outlet pipe. A drive mechanism (not shown) drives the valve stem and rotates the plug 12 within the plug body 14 between the open and closed positions. In the open position, water flows from the inlet pipe through the bore 134 of the plug and to the exit pipe. When the valve plug 12 is in the closed position, the sealing surfaces 150 of the plug seats 136 engage with the sealing surfaces 36 of the body seats 34 to prevent fluid flow through the valve. The seat rings 140 of the plug seats 136 are shaped such that the differential pressure across the seat ring adjacent the exit pipe forces that seat ring toward the mating body seat 34 to improve sealing as is well known in the art.

The body seats 34 are eccentrically positioned in the valve body 14 such that the movements of the plug seats 136 relative to the body seats 34 at the point of closure have radial components thereby producing an effective seal even with large manufacturing tolerances between the body seat sealing surfaces 36 and the plug seat sealing surfaces 150, and/or with wear on the respective components, and/or with inaccuracies in positioning of the plug seats relative to the valve body due to drive mechanism tolerances. As a result, the center axis 35 of each body seat 34 is angled relative to the axial centerline 11 of the valve assembly, as show in FIG. 2 (not to scale).

The elastomeric cylinder 142 acts to resiliently bias the seat rings 140 of the plug seats against the body seats 34 when the valve plug is in the closed position to assure a seal is formed therebetween in spite of manufacturing tolerances and wear. The elastomeric cylinder also permits the seat ring 140 to flex such that if hard debris is captured between the body seat sealing surface 36 and the plug seat sealing surface 150 during valve closure, the seat ring 140 will deflect rather than cause permanent damage or deformation to the surfaces.

Although the preferred embodiment of the valve assembly is described above, alternate embodiments are also within the scope of this invention. For instance, hardened inserts 164 (see FIG. 5) may be welded or threaded into the body seat 34 and plug seat 136 to inhibit wear of the their engaging surfaces. If a threaded insert 164 is used as shown in FIG. 5, the inserts may be replaced when worn to extend the life of the valve. Another alternative embodiment is to only have one set of body and plug seats, either adjacent to the inlet or exit port. This alternative provides a less effective seal particularly in the off-design flow direction, but reduces manufacturing costs.

The body seat and plug seat of the invention are assembled to the valve body and valve plug, respectively, according to novel methods that are also included as part of the subject matter of the invention.

Figure 6:
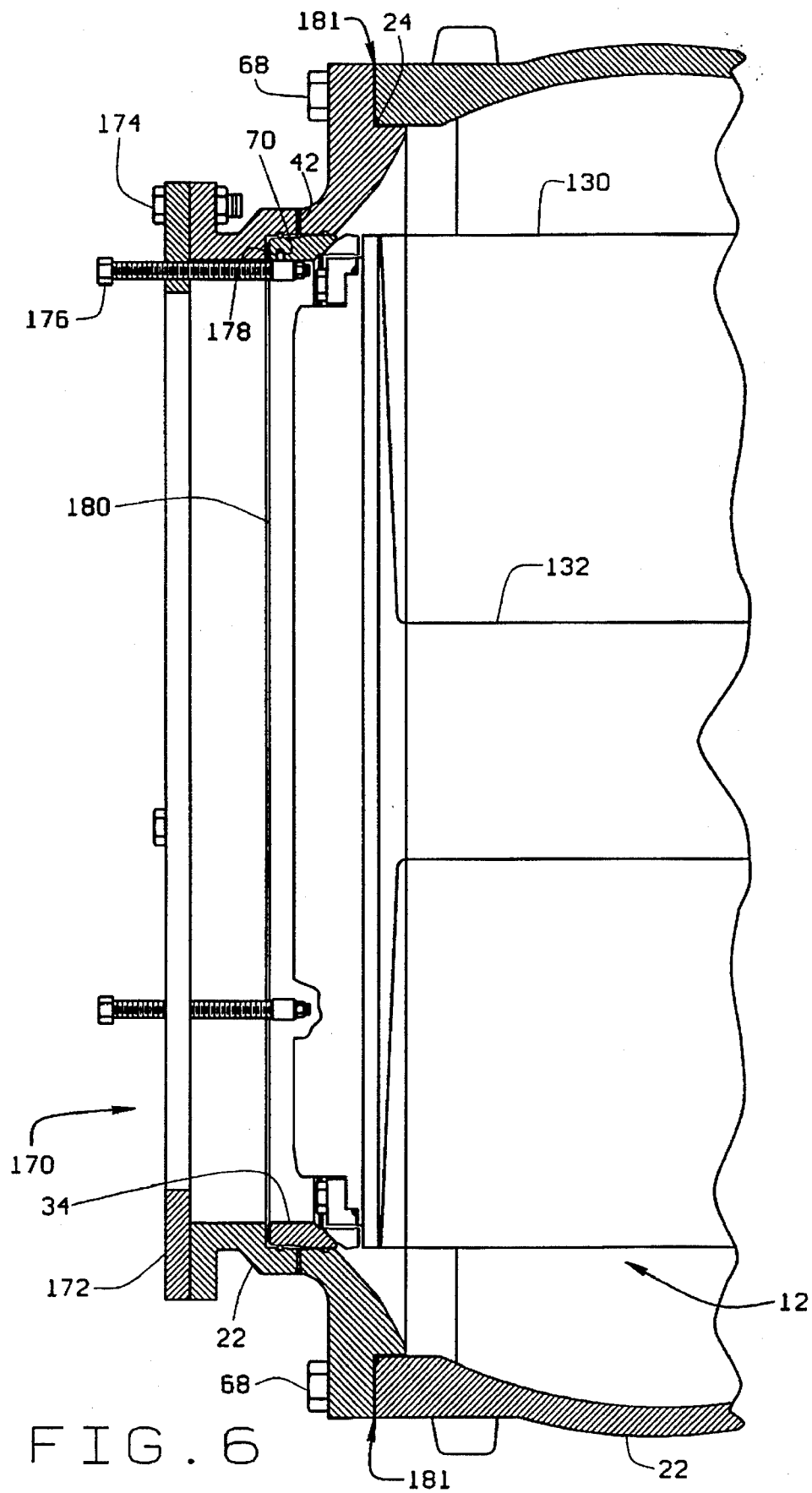
FIG. 6 is a view of the body seat ring and a tool used to pull the seat ring into the inner cylindrical surface of the valve body.

FIG. 6 shows a fixture 170 used to insert and position the body seat 34 relative to the cylindrical inner surface of the flange adaptor 22. To assemble each body seat in its flange adaptor, the inner surface of the flange adaptor is first completely coated with epoxy. Then the portion of the surface of the flange adaptor extending around and adjacent to the position of the body seat is coated with a mold release agent such as FREKOTE 810, a product of Dexter Corporation. Next, the larger diameter O-ring 52 is positioned in the groove 48 of the flange adaptor interior surface. Once the larger diameter O-ring is positioned, the body seat is partially inserted into the flange adaptor to hold the O-ring in place while the second, smaller diameter O-ring 54 is positioned in its groove 50. The tooling plate 172 of the fixture 170 is then bolted to the piping flange of the flange adaptor with slave bolts 174. Three equally spaced fixture screws 176 are then rotated in threaded holes of the plate 172 to position radial pins 178 at the distal ends of the screws opposite the radial holes 70 provided in the interior surface of the body seat. The radial pins 178 are inserted into the radial holes 70 and the fixture screws 176 are rotated to draw the body seat into the flange adaptor. The tapered outer surface of the body seat ensures that the O-rings are properly seated in their respective grooves and are not rolled out of their grooves as the body seat is pulled into the cylindrical inner surface of the flange 22. Once the gap 180 between the flange adaptor and the body seat is approximately half an inch all around, only one fixture screw is further rotated to draw the adjacent gap closed to approximately one quarter inch adjacent the one fixture screw, thereby angling the body seat relative to the valve body and creating the eccentricity of the body seat relative to the valve body.

Once the body seat is coarsely positioned within the flange adaptor as just described, the flange adaptor is bolted to the housing at the housing flange. The O-rings 24 are inserted between the housing and flange adaptors prior to their connection as the housing flange need not be broken again during assembly. The valve plug 12, with the plug seats 136 already assembled thereto, has also been previously assembled into the interior of the valve body 14 and moved to its closed position. With the flange adaptor 22 assembled to the valve body 14, the sealing surface 36 of the body seat 34 engages against the sealing surface 150 of the plug seat ring 140. Next, appropriately sized shims (not shown) are inserted about the circumference of the flange adaptor in the gap 181 between the flange adaptor and the body. The fasteners 68 holding the housing flange 30 to the housing 14 are tightened causing the flange adaptor 22 to move toward the valve body 14. However, the engagement of the body seat 34 with the plug seat ring 140 prevents the body seat from moving toward the valve body with the flange adaptor 22. Therefore the body seat 34 is forced to move relative to the flange adaptor, closing the gap 180 and properly positioning the body seat 34 relative to the plug seat ring 150 for sealing engagement of the body seat and ring. The fasteners 68 are continued to be tightened until the gap 181 between the flange adaptor and body closes on the shims.

National-pipe-thread-to-hose fittings (not shown) are screwed into the two sprues 42. The sprues are aligned with one sprue at the top of the valve body and one at the bottom and a polymeric epoxy is pressure fed into the lower sprue until epoxy overflows through the upper sprue, thereby completely filling the annular cavity 40 with epoxy while limiting the formation of air bubbles in the epoxy. The epoxy is allowed to solidify, the hoses and fittings are removed and discarded, and national-pipe-thread plugs (not shown) are inserted into the sprue ports closing the ports. Once the epoxy is sufficiently cured, the fixture 170 is removed, the shims between the body and the flange adaptor are removed, and the gap between the housing flange and housing is eliminated by torquing the fasteners 68 to a predetermined torque valve. Epoxy putty is then inserted in the gap 180 remaining between the body seat and flange adaptor to make a smooth interior surface. Thus assembled, the body seat is properly angled in the flange adaptor and the appropriate interference is formed between the body and the plug seats to assure minimal leakage. The body seat is angled relative to the body such that a centerline of the orifice or opening through the center of the annular housing flange is oriented at an angle relative to a centerline of the body seat.

Another assembly technique is used to form the elastomeric cylinder 142 between the seal ring 140 and retainer 144 of the plug seat such that voids are minimized in the silicone rubber of the elastomeric cylinder. First, the silicone rubber must be de-aired as is well known in the art. Although, other elastomers may be used, the best mode employs SILASTIC J, a silicone rubber made by Dow Corning Corporation. The seat ring and retainer are positioned on a fixture plate 190 of a chamber plate 192 shown in FIG. 7. The fixture plate 190 has an annular rib 193 (see FIG. 8) that is positioned between the seat ring 140 and retainer 144 to obtain the desired initial spacing between the concentric seat ring and retainer. Then, the silicone rubber is pumped into the annular cavity between the seat ring 140 and retainer 144 through a nozzle 194 as shown in FIG. 8. The nozzle is used to assure that the entire cavity is filled and no voids are formed by the elastomer not reaching the bottom of the cavity. Immediately after filling the cavity with silicone rubber, a dome 196 is installed on the chamber plate 192 with an O-ring 198 sealing the connection of the dome and plate. The chamber plate and dome are fastened together with slave bolts 200 and the interior volume 199 between the chamber plate and dome is then pressurized for several hours until the silicone rubber is cured. The pressure supplied to the dome interior 199 reduces the size of any air bubbles or voids existing in the elastomeric cylinder 142. Once cured, the dome 196 is disassembled from the chamber plate 192 and the plug seat 136, including the retainer 144, the elastomeric cylinder 142 formed from the injected silicone rubber, and the seat ring 140, is removed from the fixture plate and is ready for use either in a newly manufactured valve assembly or as a field-replacement unit.

Frustoconical is used as shorthand notation throughout this application to mean either frustoconical, shaped as a frustum of a pyramid, or shaped as a frustum of a segment of a sphere.

While the present invention has been described by reference to a specific embodiment, it should be understood that modifications and variations of the invention may be constructed without departing from the scope of the invention defined in the following claims. In particular, it should be understood that although the preferred embodiment of the invention is described as used in spherical plug valves, the inventions may be used in other types of valves.

What is claimed is:

1. A valve assembly comprising:
   a valve body having a first and second orifice extending therethrough, the first orifice including an internal surface surrounding the first orifice, the internal surface having a continuous sealing groove extending around the first orifice;
   a body seat rigidly attached to the valve body with a polymeric epoxy adjacent the first orifice, the body seat having a substantially constant width and including a frustoconically-shaped seating surface and an outer peripheral surface, the outer peripheral surface being fit within the first orifice internal surface;
   a seal ring received within the continuous sealing groove for maintaining a fluid-tight seal between the internal surface of the first orifice and the outer peripheral surface of the body seat; and
   a valve plug mounted within the valve body, the valve plug being movable within the valve body between an open and a closed position, the valve plug having a hollow bore extending through the valve plug, the valve plug bore being aligned with the first and second orifices when the valve plug is in the open position thereby enabling fluid flow between the first and second orifices through the valve plug bore, the valve plug having at least one plug seat attached thereto, the plug seat having an annular sealing surface configured to seal against the seating surface of the body seat, the plug seat being aligned with the body seat and the sealing surface of the plug seat sealing against the seating surface of the body seat when the valve plug is in the closed position to substantially prevent fluid flow between the first and second orifices.

2. The valve of claim 1, wherein:
   the valve body includes a sprue extending therethrough for injecting the polymeric epoxy between the body seat and the valve body.

3. The valve of claim 1, wherein:
   the internal surface of the first valve body orifice and the outer peripheral surface of the body seat each have circumferential serrations to increase mechanical bonding of the polymeric epoxy to the valve body and body seat.

4. The valve of claim 1, wherein:
   the internal surface of the first valve body orifice is coated with a releasing agent and the polymeric epoxy is mechanically bonded to the valve body orifice internal surface against the releasing agent.

5. The valve assembly of claim 1 wherein:
   the internal surface of the valve body orifice is centered about a first centerline extending through the first orifice of the valve body; and
   the body seat has a second centerline about which the seating surface is centered, the second centerline extending through the body seat and being oriented at an angle relative to the first centerline.

6. The valve assembly of claim 1 wherein:
   the outer peripheral surface of the body seat is tapered relative to the internal surface of the first orifice so that the seal ring is gradually compressed into the continuous sealing groove as the body seat is inserted to fit within the first orifice internal surface, thereby preventing the seal ring from rolling out of the groove during insertion of the body seat.

7. A valve assembly comprising:
   a valve body having a plurality of orifices extending therethrough, at least one of the plurality of orifices having a body seat around the orifice, the body seat having a sealing surface, the body seat being rigidly attached to the valve body with an epoxy polymer;
   a valve plug in the valve body, the valve plug being movable relative to the valve body between an open and a closed position, the valve plug including a hollow bore extending therethrough, the bore being aligned with the plurality of orifices when the valve plug is in the open position to permit fluid to flow between the plurality of valve body orifices and through the bore; and
   a replaceable plug seat including a seat ring, a retainer, and an elastomeric cylinder, the retainer being releasably fastened to the valve plug, the seat ring being connected to the retainer by the elastomeric cylinder so that the seat ring is permitted to move relative to the retainer and the valve plug under load, the seat ring including an annular sealing surface configured to engage the sealing surface of the body seat to form a substantially fluid-tight interface therewith, the sealing surface of the seat ring being engaged with the sealing surface of the body seat when the valve plug is in the closed position to inhibit fluid flow between the plurality of orifices.

8. The valve assembly of claim 7 wherein:
   the internal surface of the valve body orifice is centered about a first centerline extending through the first orifice of the valve body; and
   the body seat has a second centerline about which the seating surface is centered, the second centerline extending through the body seat and being oriented at an angle relative to the first centerline.

9. The valve of claim 8, wherein:
   the seat ring and retainer each include a series of circumferential serrations connected to the elastomeric cylinder.

10. The valve of claim 8, wherein:
    the seat ring and valve plug are spaced from one another to permit the seat ring to move relative to valve plug when the sealing surface of the seat ring is engaged with the sealing surface of the body seat in the closed position.

11. The valve of claim 8, wherein:

the internal surface of the valve body is coated with a releasing agent and the polymeric epoxy is mechanically bond to the valve body internal surface against the releasing agent.

12. The valve assembly of claim 7 wherein:

the retainer is releasably fastened to the valve plug with threaded fasteners.

13. The valve assembly of claim 7 wherein:

the retainer is bolted to the valve plug.

* * * * *